United States Patent
Heslop et al.

(10) Patent No.: US 6,639,028 B2
(45) Date of Patent: Oct. 28, 2003

(54) PROCESS FOR THE CONTINUOUS GAS-PHASE (CO-)POLYMERIZATION OF OLEFINS IN A FLUIDIZED BED REACTOR

(75) Inventors: David Heslop, Istres (FR); Jean-Pierre Isnard, Martigues (FR); Myung-Je Shin, Anvers (BE)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/092,431

(22) Filed: Mar. 8, 2002

(65) Prior Publication Data

US 2002/0132938 A1 Sep. 19, 2002

Related U.S. Application Data

(63) Continuation of application No. PCT/GB00/03400, filed on Sep. 5, 2000.

(30) Foreign Application Priority Data

Sep. 9, 1999 (EP) .............................................. 99430019

(51) Int. Cl.$^7$ .................................................. C08F 4/24
(52) U.S. Cl. ........................ 526/106; 526/68; 526/140; 526/141; 526/138; 526/105; 526/348.2; 526/348.6; 526/201
(58) Field of Search .......................... 526/106, 68, 901, 526/140, 141, 138, 105, 348.2, 348.6, 201

(56) References Cited

U.S. PATENT DOCUMENTS 4,182,810 A * 1/1980 Willcox ........................ 526/64
5,026,795 A 6/1991 Hogan

FOREIGN PATENT DOCUMENTS

| DE | 43 07 649 A1 | 9/1993 |
| EP | 0 005 215 | 11/1979 |
| EP | 0 453 116 A1 | 10/1991 |
| EP | 0 636 636 | 2/1995 |
| WO | WO 96/32420 | 10/1996 |

* cited by examiner

Primary Examiner—David W. Wu
Assistant Examiner—William Cheung
(74) Attorney, Agent, or Firm—Finnegan, Henderson, Farabow, Garrett and Dunner, L.L.P.

(57) ABSTRACT

A process for the gas-phase (co-)polymerization of olefins in a fluidized bed reactor using a chromium oxide catalyst. The polymerization is performed in the presence of a process aid additive.

16 Claims, No Drawings

PROCESS FOR THE CONTINUOUS GAS-PHASE (CO-)POLYMERIZATION OF OLEFINS IN A FLUIDIZED BED REACTOR

CROSS REFERENCE TO RELATED APPLICATIONS

This application is a continuation of international application number PCT/GB 00/03400, filed Sep. 5, 2000, the content of which is incorporated herein by reference, and claims the priority of European Patent Application No. 99430019.2, filed Sep. 9, 1999.

BACKGROUND OF THE INVENTION

The present invention relates to a process for the continuous gas-phase (co-)polymerisation of olefins in a fluidised bed reactor using a chromium oxide catalyst.

The present invention also relates to a process for preventing fouling during the continuous gas-phase (co-)polymerisation of olefins in a fluidised bed reactor using a chromium oxide catalyst.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst would become inactive or the bed would begin to melt. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external beat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas is used to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is also well known that chromium oxide or "Phillips" catalysts can advantageously be used for the (co-)polymerisation of olefins, particularly in slurry processes as well as in gas phase processes. It is even reported in the literature that chromium oxide catalysts are much less or even not prone to fouling problems in olefin gas phase polymerisation processes in comparison with Ziegler-Natta catalysts which exhibit many fouling problems.

While the man in the art specialised in olefin gas phase polymerisation is still pursuing his understanding of the fouling phenomena associated with the use of Ziegler-Natta catalysts, in particular metallocene based catalysts, there is still a need in the art to find a process for producing more successfully polyolefins on gas phase industrial plants using a chromium oxide catalyst.

The Applicants have now unexpectedly found a simple and efficient process which allows us to improve the gas phase polymerisation of olefins using a chromium oxide catalyst. This was done through a detailed analysis of the rare problems occurring during the olefin gas phase polymerisation using a chromium oxide catalyst. Amongst those problems, one can recite slight fouling which can repeatedly occur during polymerisation and provoke periods of off specification materials, fouled lumps, . . . ; hot spot phenomena related to points of higher than average temperature within the polymerisation zone; static phenomena measured with static probes within the polymerisation zone were also part of the detailed analysis and study.

Surprisingly, the very simple process of the Applicants provides an industrial solution to all these problems, in particular to the fouling problems that could affect gas phase polymerisation of olefins with chromium oxide catalysts.

SUMMARY OF THE INVENTION

In accordance with the present invention, there has now been found a process for the gas-phase (co-)polymerisation of olefins in a fluidised bed reactor using a chromium oxide catalyst in the presence of a process aid additive wherein the additive comprises at least one of the components selected from:

(1) a polysulphone copolymer, (2) a polymeric polyamine, and (3) an oil-soluble sulphonic acid.

Preferably, the process aid additive comprises at least two components selected from above components (1), (2) and (3). More preferably, the process aid additive comprises a mixture of (1), (2) and (3).

The process aid additive can be added at any location of the fluidised bed polymerisation system, e.g. in the reactor itself, below the fluidisation grid or above the grid in the fluidised bed, above the fluidised bed, in the powder disengagement zone of the reactor (also named velocity reduction zone), anywhere in the reaction loop or recycle line, in the fines recycle line (when a fines separator, preferably a cyclone, is used), etc. According to a preferred embodiment of the present invention, the process aid additive is added directly into the fines recycle line (when a fines separator, preferably a cyclone, is used), or directly into the polymerisation zone, more preferably directly into the fluidised bed, ideally into the lower part of the bed (below half bed height). For the purposes of the present invention and appended claims, the polymerisation zone means the reaction zone consisting of the fluidised bed itself, and the region above the fluidised bed which consists of the powder disengagement zone and/or the velocity reduction zone. According to another preferred embodiment of the present invention, the process aid additive is added at at least two different locations of the fluidised bed polymerisation system. It is also particularly preferred according to the present invention that the process aid additive is not added in admixture with a catalyst component like the catalyst itself or the cocatalyst. According to another preferred embodiment, the process aid additive is added into the fluidised bed polymerisation system through the well known BP high productivity nozzles which protrude through the fluidisation grid directly into the fluidised bed (see e.g. W09428032, the content of which is incorporated hereby). It is also particularly preferred that the process aid additive is not added in admixture with a liquid comonomer used for the copolymerisation.

According to the present invention, the polysulphone copolymer component of the process aid additive (often designated as olefin-sulphur dioxide copolymer, olefin polysulphones, or poly(olefin sulphone)), is a polymer, preferably a linear polymer, wherein the structure is considered to be that of alternating copolymers of the olefins and sulphur dioxide, having a one-to-one molar ratio of the comonomers with the olefins in head to tail arrangement. Preferably, the polysulphone copolymer consists essentially of about 50 mole percent of units of sulphur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —$(C_xH_{2x})$—COOH wherein x is from 0 to about 17, and B is hydrogen or carboxyl, with the proviso that when B is carboxyl, x is 0, and wherein A and B together can be a dicarboxylic anhydride group.

Preferably, the polysulphone copolymer employed in the present invention has a weight average molecular weight in the range 10,000 to 1,500,000, preferably in the range 50,000 to 900,000. The units derived from the one of more 1-alkenes are preferably derived from straight chain alkenes having 6–18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid. For further details of polysulphones particularly suitable for use in the present invention reference may be made to UK patent specifications 1,432,265, 1,432,266, and U.S. Pat. Nos. 3,811,848 and 3,917,466.

A preferred polysulphone copolymer is 1-decene polysulphone having an inherent viscosity (measured as a 0.5 weight percent solution in toluene at 30° C.) ranging from about 0.04 dl/g to 1.6 dl/g.

According to the present invention, the polymeric polyamine component of the process aid additive is preferably a polymeric polyamine having the general formula:
RN[$(CH_2CHOHCH_2NR^1)_a$—$(CH_2CHOHCH_2NR^1$—$R^2$—$NH)_b$—$(CH_2CHOHCH_2NR^3)_c$H]$_x$H$_{2-x}$, wherein $R^1$ is an aliphatic hydrocarbyl group of 8 to 24 carbon atoms, $R^2$ is an alkylene group of 2 to 6 carbon atoms, $R^3$ is the group —$R^2$—$R^1$, R is $R^1$ or an N-aliphatic hydrocarbyl alkylene group having the formula $R^1NHR^2$—;

a, b and c are integers of 0–20 and x is 1 or 2; with the proviso that when R is $R^1$ then a is an integer of 2 to 20 and b=c=0, and when R is $R^1NHR^2$— then a is 0 and b+c is an integer of 2 to 20.

The polymeric polyamines which can be suitably employed in the process of the present invention are described in U.S. Pat. No. 3,917,466, in particular at column 6 line 42 to column 9 line 29.

DETAILED DESCRIPTION OF THE INVENTION

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, eg a mixture of xylene and isopropanol, adding a strong base, eg sodium hydroxide and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo 130" sold by Universal Oil Company.

According to the present invention, the oil-soluble sulphonic acid component of the process aid additive is preferably any oil-soluble sulphonic acid such as an alkane sulphonic acid or an alkylaryl sulphonic acid. A useful sulphonic acid is petroleum sulphonic acid resulting from treating oils with sulphuric acid.

Preferred oil-soluble sulphonic acids are dodecylbenzene sulphonic acid and dinonylnaphthyl sulphonic acid.

In accordance with the present invention, the process aid additive preferably comprises 1 to 25 weight percent of the polysulphone copolymer, 1 to 25 weight percent of the polymeric polyamine, 1 to 25 weight percent of the oil-soluble sulphonic acid and 25 to 95 weight percent of a solvent. Neglecting the solvent, the process aid additive preferably comprises about 5–70 weight percent polysulphone copolymer, 5–70 weight percent polymeric polyamine, and 5–70 weight percent oil-soluble sulphonic acid the total of course being 100 percent.

Suitable solvents include aromatic, paraffin and cycloparaffin compounds.

The solvents are preferably selected from among benzene, toluene, xylene, cyclohexane, fuel oil, isobutane, kerosene and mixtures thereof for instance.

According to a preferred embodiment of the present invention, the process aid additive is diluted in a conventional hydrocarbon diluent, which can be the same or different from the above solvent, preferably butane, pentane or hexane.

When a diluent is used, the process aid additive (including the solvent thereof) is preferably present in an amount comprised between 0.1 and 500 g per liter of diluent, preferably between 1 and 50 g per liter of diluent.

According to a preferred embodiment of the present invention, the total weight of components (1), (2), (3), the solvent and the diluent represents essentially 100% of the weight of the process aid additive.

One useful composition, for example, consists of 13.3 weight percent 1:1 copolymer of 1-decene and sulphur dioxide having an inherent viscosity of 0.05 determined as above, 13.3 weight percent of "Polyflo 130" (1:1.5 mole ratio reaction product of N-tallow-1,3-diaminopropane with epichlorohydrin), 7.4 weight percent of either dodecylbyl sulphonic acid or dinonylnaphthyl sulphonic acid, and 66 weight percent of an aromatic solvent which is preferably toluene or kerosene.

Another useful composition, for example, consists of 2 to 7 weight percent 1:1 copolymer of 1-decene and sulphur dioxide having an inherent viscosity of 0.05 determined as above, 2 to 7 weight percent of "Polyflo 130" (1:1.5 mole ratio reaction product of N-tallow-1,3-diaminopropane with epichlorohydrin), 2 to 8 weight percent of either dodecylbyl sulphonic acid or dinonylnaphthyl sulphonic acid, and 78 to 94 weight percent of an aromatic solvent which is preferably a mixture of 10 to 20 weight percent toluene and 62 to 77 weight percent kerosene.

The additive composition of the present invention (including the solvent and diluent therefor) is preferably added to the reactor in an amount ranging from about 0.02 to about 50000 ppm, preferably from about 0.2 to about 10000 ppm, more preferably from about 2 to 1000 ppm, based on the weight of the olefin introduced into the reactor.

Based on the total weight of just the polysulphone polymer, polymeric amine and oil-soluble sulphonic acid, the preferred concentration of the aid additive is from about 0.00001 to about 35, preferably from about 0.0001 to about 7.5, more preferably from about 0.006 to about 4 parts by weight per million parts by weight of the olefin introduced into the reactor.

The process aid additive can be added continuously or intermittently to the reactor. In the continuous gas phase polymerisation process according to the present invention, it is preferred to add continuously the additive to the reactor. Sufficient process aid additive is added to maintain its concentration at the desired level.

According to a preferred embodiment of the present invention, before the chromium oxide catalyst is introduced into the reactor, the reactor is pre-loaded with the said process aid additive. This pre-load can be done before or after the introduction of the seed bed polymer into the reactor; however, it is preferred to perform the pre-load solely on the seed bed polymer.

For the pre-load, the additive composition of the present invention (including the solvent and diluent therefor) is preferably added to the reactor in an amount ranging from about 0.02 to about 50000 ppm, preferably from about 0.2 to about 10000 ppm, more preferably from about 2 to 1000 ppm, based on the weight of the seed polymer bed.

Based on the total weight of just the polysulphone polymer, polymeric amine and oil-soluble sulphonic acid, the preferred concentration of the aid additive is from about 0.00001 to about 35, preferably from about 0.0001 to about 7.5, more preferably from about 0.006 to about 4 parts by weight per million parts by weight of the seed polymer bed.

According to a preferred embodiment of the present invention, the process aid additive is a material sold by Octel under the trade name STADIS, preferably STADIS 450, more preferably STADIS 425, said STADIS components being preferably added at a rate of 0.001 to 50 ppm by weight of the olefin introduced into the reactor and/or at a concentration of 0.01 to 10 ppm by weight of the seed polymer bed in case of pre-load.

In accordance with the present invention, there is also provided a process for preventing fouling during the gas-phase (co-)polymerisation of olefins in a fluidised bed reactor using a chromium oxide catalyst in the presence of a process aid additive characterised in that the additive comprises a mixture of (1) a polysulphone copolymer,
(2) a polymeric polyamine, and
(3) an oil-soluble sulphonic acid.

The process according to the present invention is suitable for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon (s), such as C4–C8 alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–112° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335, 526. The process of the invention is particularly well suited to industrial-scale reactors of very large.size.

In one embodiment the reactor used in the present invention is capable of producing greater than 300 Kg/hr to about 80,000 Kg/hr or higher of polymer, preferably greater than 10,000 Kg/hr.

The polymerisation reaction is carried out in the presence of a chromium oxide catalyst.

Examples of chromium oxide catalysts according to the present invention are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C.

The catalyst preferably contains from 0.05 to 5%, more preferably from 0.1 to 2%, by weight of chromium.

The catalyst can contain, in addition to the chromium, from 0.1 to 10% of titanium in the form of titanium oxide and/or fluorine and/or aluminium, in particular in the form of aluminium oxide.

The catalyst can be used as it is or optionally in the form of a coated catalyst or prepolymer containing, for example, from $10^{-5}$ to 3, preferably from $10^{-1}$ to $10^{-1}$, millimoles of chromium per gram of polymer. The process of the invention is particularly suited to the use of a non-prepolymerized catalyst, preferably to the direct introduction of a chromium oxide silica supported catalyst.

The chromium oxide catalysts used in the present invention may be used together with a cocatalyst or activator, e.g. an organometallic compound of a metal from groups I to III of the Periodic Classification of the Elements, such as, for example, an organoaluminum compound. This compound is used in particular to purify the reaction gas mixture Examples of catalysts can be found, for example, in EP275675, EP453116, or WO9912978, the contents of which are hereby incorporated by reference.

The following non limiting examples illustrate the present invention.

EXAMPLE

Preparation of the Catalyst (PIX134)

15 Kg of a catalyst powder, sold under the trade name of EP350X® by Crosfield Catalysts (Warrington, England) are charged to a fluidised bed reactor-heated to 50° C. and fluidised with a current of dry nitrogen. This catalyst is composed of a chromium compound supported on a silica titanium cogel containing about 1% by weight of chromium and about 2.4% by weight of titanium. The reactor is next heated from 50 to 150° C. at a rate of 90° C. per hour and is maintained at this temperature for 30 minutes. Next the reactor is heated to 300° C. at a rate of 90° C. per hour and maintained at this temperature for 2 hours. Next the fluidising nitrogen stream is replaced by a fluidising air stream and the reactor is maintained at 300° C. for another 2 hours. Next the reactor is heated at a rate of 90° C. per hour to 815° C. and maintained at 815° C. for 8 hours. Finally the reactor is cooled at a rate of 90° C. per hour to 300° C. The fluidising air stream is replaced by a fluidising nitrogen stream and the reactor is cooled to room temperature (25° C.).

15 Kg of an activated catalyst containing 1% by weight of chromium and 2.4% by weight of titanium is recovered. It is stored in a dry nitrogen atmosphere.

Process

The process is carried out in a fluidised bed gas phase polymerisation reactor consisting of a vertical cylinder of diameter 0.74 m and height 7 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a compressor and with a heat transfer means. Opening into the gas recycling line there are, in particular, the feed lines for ethylene, 1-hexene and nitrogen which represent the main constituents of the gas reaction mixture passing through the fluidised bed.

Above the fluidisation grid the reactor contains a fluidised bed consisting of a high density polyethylene powder. The gas reaction mixture, which contains ethylene, 1-hexene, hydrogen and nitrogen passes through the fluidised bed at a pressure of 2 MPa, at 85° C. and with an upward fluidisation velocity of 0.47 m/s.

The catalyst which has been prepared according to the above method is directly introduced into the reactor.

The polymerisation operating conditions are

T polymerisation=85° C.

pC2 (ethylene)=0.3 Mpa pC5 (pentane)=0.4 MPa ptot=2 Mpa fluidisation velocity=47 cm/s 1-hexene vs ethylene flow rate ratio=3.2 kg hexene per T of ethylene Hot spots started rapidly to appear on the internal penetrating temperature probes, as well as on the skin temperature probes located in the 0.8 to 1.2 m (above the fluidisation grid) zone of the reactor. The only way to eliminate or at least reduce the detrimental impact of these hot spots, is to limit the production rate to about 90 kg of polymer per hour.

After a few days of unstable operations faced in these conditions, the process aid additive STADIS 425 is introduced into the reactor. It is diluted in pentane in a ratio of 7 g of STADIS 425 per liter of pentane. It is introduced directly into the fluidised bed reactor at a level of 1 m (above the fluidisation grid) in an amount equal to 5 ppm of STADIS 425 versus the total olefin introduction.

Under these conditions a high density polyethylene with a density of 0.946, a high load melt index of 14 g/10 minutes under a 21.6-kg load at 190° C. is manufactured successfully at an output of 130 kg/h with a catalyst productivity of 2500 g of polymer per g of catalyst without any perturbations. No hot spots occurred under these conditions. The use of Stadis was considered as a major improvement for the process since the production rate could be increased by a factor of about 50% while maintaining stable and successful operations.

At the end of the run, the reactor was opened/inspected and revealed no indication of fouling, i.e. the reactor wall (the cylindrical section as well as the bulb) was perfectly clean.

What is claimed is:

1. A process for the continuous gas-phase (co-)polymerisation of olefins comprising (co-)polymerising one or more olefins in a polymerisation zone of a fluidised bed reactor using a chromium oxide catalyst in the presence of a process aid additive, wherein the additive comprises at least one of the components selected from the group consisting of
   (1) a polysulphone copolymer,
   (2) a polymeric polyamine, and
   (3) an oil-soluble sulphonic acid.

2. Process according to claim 1 wherein the process aid additive is directly added into the polymerisation zone.

3. Process according to claim 2 wherein the process aid additive is directly added into the fluidised bed polymerisation reaction zone.

4. Process according to claim 1 wherein the process aid additive is not added in admixture with the catalyst or a cocatalyst.

5. Process according to claim 1 wherein the process aid additive is not admixed with a liquid carrier or one or more of the olefins in liquid form.

6. Process according to claim 1 wherein the process aid additive comprises at least two components selected from components (1), (2) or (3).

7. Process according to claim 6 wherein the process aid additive comprises a mixture of components (1), (2) and (3).

8. Process according to claim 7 wherein the process aid additive comprises about 5–70 weight percent polysulphone copolymer, 5–70 weight percent polymeric polyamine, and 5–70 weight percent oil-soluble sulphonic acid.

9. Process according to claim 1 wherein the process aid additive represents from about 0.00001 to about 35 parts by weight per million parts by weight of olefin introduced into the reactor.

10. Process according to claim 1 wherein the reactor is preloaded with the process aid additive before the chromium oxide catalyst is introduced into the reactor.

11. Process according to claim 10 wherein the pre-load is performed on seed bed polymer.

12. Process according to claim 1 wherein the one or more olefins is ethylene or propylene.

13. Process according to claim 12 wherein the one or more olefins are ethylene and the one or more comonomers is selected from but-1-ene, hex-1-ene, or 4-methylpent-1-ene.

14. Process according to claim 9 wherein the process aid additive represents about 0.0001 to about 7.5 parts by weight per million parts by weight of olefin introduced into the reactor.

15. Process according to claim 14 wherein the process aid additive represents about 0.006 to about 4 parts by weight per million parts by weight of olefin introduced into the reactor.

16. Process according to claim 1 wherein the one or more olefins are ethylene or propylene and one or more comonomers selected from the group consisting of but-1-ene, pent-1-ene, hex-1-one, 4-methylpent-1-ene, and oct-1-ene.

* * * * *

UNITED STATES PATENT AND TRADEMARK OFFICE
CERTIFICATE OF CORRECTION

PATENT NO. : 6,639,028 B2
DATED : October 28, 2003
INVENTOR(S) : David Helsop et al.

It is certified that error appears in the above-identified patent and that said Letters Patent is hereby corrected as shown below:

Title page,
Item [57], ABSTRACT,
Line 2, "catalyst. The" should read -- catalyst wherein the --.
Line 3, "additive." should read -- additive selected from at least one of (1) a polysulphone copolymer, (2) a polymeric polyamine, and (3) an oil-soluble sulphonic acid. --.

Column 10,
Line 13, "claim 12" should read -- claim 16 --.
Line 29, "hex-1-one," should read -- hex-1-ene, --.

Signed and Sealed this

Twenty-first Day of June, 2005

JON W. DUDAS
*Director of the United States Patent and Trademark Office*